US010781291B2

(12) United States Patent
Perez Madrid et al.

(10) Patent No.: US 10,781,291 B2
(45) Date of Patent: Sep. 22, 2020

(54) BIODEGRADABLE, PROGRAMMABLE SYNTHETIC POLYMERIC MATERIAL AND ITS PREPARATION PROCESS

(71) Applicant: Mariana Perez Palacio, Medellin, Antioquia (CO)

(72) Inventors: Manuel Salvador Perez Madrid, Antioquia (CO); Otoniel Felipe Gomez Palacio, Antioquia (CO); Leandro Contreras Zapata, Boston, MA (US); Juan David Aristizabal Yepes, Boston, MA (US); Milton Cesar Meneses Timana, Antioquia (CO); Juan Carlos Ramirez, Antioquia (CO); Jimmy Collazos Franco, Antioquia (CO); Diego Juan Ortiz Velasquez, Antioquia (CO); Juan Manuel Osorio Betancur, Antioquia (CO); Mariana Perez Palacio, Antioquia (CO)

(73) Assignee: Mariana Perez Palacio, Medellin, Antioquia (CO)

( * ) Notice: Subject to any disclaimer, the term of this patent is extended or adjusted under 35 U.S.C. 154(b) by 120 days.

(21) Appl. No.: 16/050,243

(22) Filed: Jul. 31, 2018

(65) Prior Publication Data
US 2019/0048149 A1    Feb. 14, 2019

(30) Foreign Application Priority Data
Jul. 31, 2017    (CO) ........................ NC2017/0007808

(51) Int. Cl.
*C08K 5/01*    (2006.01)
*B29B 9/06*    (2006.01)
(Continued)

(52) U.S. Cl.
CPC ............. *C08J 3/2053* (2013.01); *B29B 7/007* (2013.01); *B29B 9/06* (2013.01); *B29C 48/0018* (2019.02);
(Continued)

(58) Field of Classification Search
None
See application file for complete search history.

(56) References Cited

U.S. PATENT DOCUMENTS 5,321,065 A * 6/1994 Bono ........................ C08J 5/18
428/220

FOREIGN PATENT DOCUMENTS

CN    101302319 A       11/2008
CN    105694201 A *     6/2016
(Continued)

OTHER PUBLICATIONS

Decision to Grant Patent issued in Colombian Application No. NC2017/0007808 dated Jul. 30, 2019 (14 pages).

*Primary Examiner* — Peter A Salamon
(74) *Attorney, Agent, or Firm* — Lucas & Mercanti, LLP

(57) ABSTRACT

The present invention is directed to a process for manufacturing a biodegradable synthetic polymeric material wherein the process has the steps of binding, pelletizing, extruding; and sealing. Moreover, the invention discloses degrading substances which participate in the first three steps (a, b, c) wherein the degrading substances comprise betaine ($C_5H_{11}NO_2$), cassava (yucca) starch ($C_6H_{10}O_5$), carrot carotene ($C_{40}H_{56}$), water, carbon monoxide, corn glucose ($C_6H_{12}O_6$), and a carboxylic acid of 1 to 6 carbon atoms.

8 Claims, 3 Drawing Sheets

Figure 1:
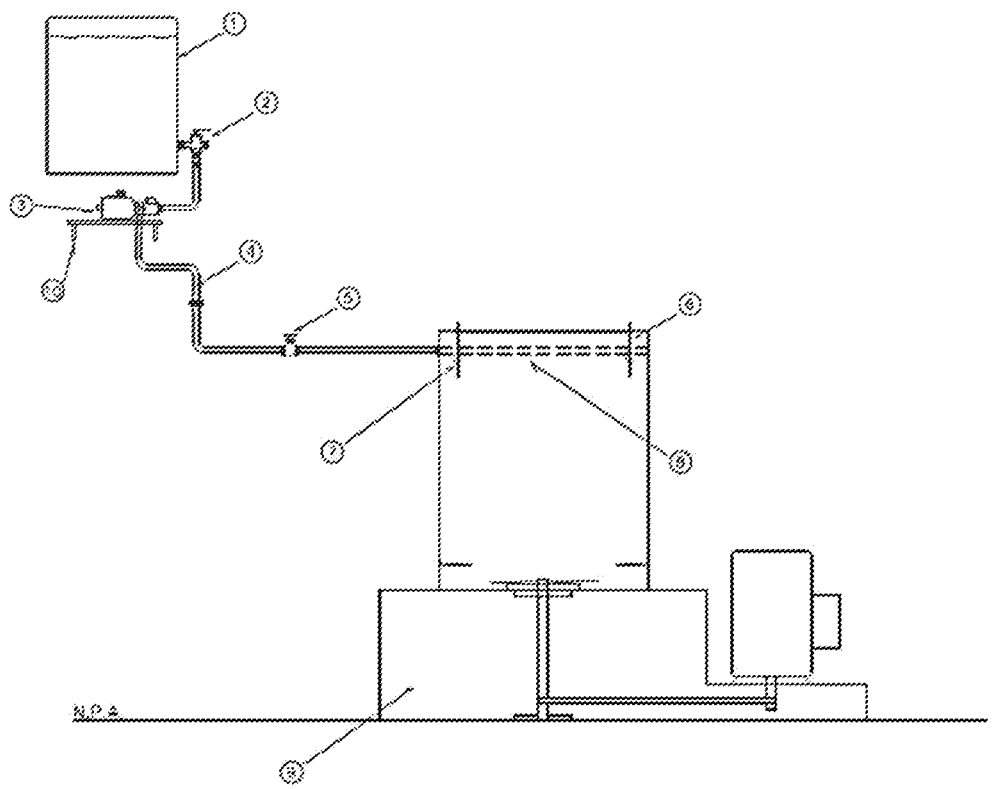

1- S.D. STORAGE TANK
2- S.D. OUTPUT MECHANIC SYSTEM
3- PUMP
4- DUCTS AND ACCESORIES
5- STOPCOCK
6- FASTENING MECHANISM
7- S.D. IRRIGATION MECAHNIC SYSTEM
8- S.D. DISTRIBUTION MECHANIC SYSTEM
9- BINDER AND ITS ACCESORIES
10- PUMP SUPPORT

(51) Int. Cl.
    *C08L 101/16* (2006.01)
    *C08J 3/205* (2006.01)
    *B29C 48/00* (2019.01)
    *C08J 11/04* (2006.01)
    *B29C 48/88* (2019.01)
    *B29C 48/885* (2019.01)
    *B29B 7/00* (2006.01)
    *B29C 48/10* (2019.01)
    *C08K 5/00* (2006.01)
    *C08K 5/19* (2006.01)
    *C08K 5/1545* (2006.01)
    *B29K 105/00* (2006.01)
    *C08K 5/09* (2006.01)
    *B29B 7/38* (2006.01)

(52) U.S. Cl.
    CPC ............ *B29C 48/10* (2019.02); *B29C 48/885* (2019.02); *B29C 48/913* (2019.02); *C08J 11/04* (2013.01); *C08K 5/0033* (2013.01); *C08K 5/01* (2013.01); *C08L 101/16* (2013.01); *B29B 7/38* (2013.01); *B29K 2105/0017* (2013.01); *B29K 2995/006* (2013.01); *C08J 2403/02* (2013.01); *C08K 5/09* (2013.01); *C08K 5/1545* (2013.01); *C08K 5/19* (2013.01); *C08K 2201/018* (2013.01)

(56) References Cited

FOREIGN PATENT DOCUMENTS

| | | |
|---|---|---|
| CN | 105694201 A | 6/2016 |
| ES | 2065676 T3 | 2/1995 |
| MX | 2014015068 A | 6/2016 |

\* cited by examiner

1- S.D. STORAGE TANK
2- S.D. OUTPUT MECHANIC SYSTEM
3- PUMP
4- DUCTS AND ACCESORIES
5- STOPCOCK
6- FASTENING MECHANISM
7- S.D. IRRIGATION MECAHNIC SYSTEM
8- S.D. DISTRIBUTION MECHANIC SYSTEM
9- BINDER AND ITS ACCESORIES
10- PUMP SUPPORT

11- S.D. STORAGE TANK
12- S.D. OUTPUT MECHANIC SYSTEM
13- INLET DUCT
14- S.D. RECIRCULATION DUCTS
15- S.D. PASSAGE MECHANIC SYSTEM
16- FASTENING TRAY-DUCTS
17- STAINLESS TRAY, REF. 304L
19- CENTRIFUGAL PUMP
20- CUTTING MECHANIC SYSTEM
21- PELLETIZER AND MECHANIC ACCESORIES
22- ELECTRIC CONTROL SYSTEM
23- AUXILIARY TANK WITH CENTRIFUGAL PUMPING SYSTEM

24- COMPRESSOR CAPACITY 180 PSI
25- AIR DUCT
26- AIR DISTRIBUTION MECHANIC SYSTEM
27- EXTRUDED MATERIAL OUTLET
28- MECHANIC SYSTEM IF S.D. APPLICATION TO EXTRUDED MATERIAL.
29- EXTRUDED MATERIAL.
30- S.D. MATERIAL AND POLYMER(SOLID) INLET
31- EXTRUDER

BIODEGRADABLE, PROGRAMMABLE SYNTHETIC POLYMERIC MATERIAL AND ITS PREPARATION PROCESS

CROSS REFERENCE TO RELATED APPLICATION

This application claims priority of Colombian Application No. NC2017/0007808 filed Jul. 31, 2017, application which is incorporated herein by reference.

FIELD OF THE INVENTION

The present invention refers to potentization of recycled synthetic polymer degradation based on the addition of a substance in its manufacture process, more specifically, the film of a plastic bag. In addition, the present invention is located in the technical field of environmental friendly, biodegradable polymeric materials and to the field of polymeric industry wherein the lifespan of the bag can be programmed.

SUMMARY OF THE INVENTION

The present invention is directed to a process for manufacturing a biodegradable synthetic material wherein the process has the steps of (a) binding, (b) pelleting, (c) extruding, and (d) sealing. Moreover, the invention discloses degradable substances which cooperate in the first three steps (a, b, c) wherein the degradable substances comprise betaine ($C_5H_{11}NO_2$), yuca starch ($C_6H_{10}O_5)_n$, carrot carotene ($C_{40}H_{56}$), water; carbon monoxide, corn glucose $C_6H_{12}O_6$; and carboxylic acid.

BACKGROUND

A current concern is to achieve the biodegradation of chemically synthetized polymeric materials in order to aid in the environment conservation. Document CO 99043.607 relates to a process for manufacturing and recycling plastic material and method for manufacturing thereof. This process comprises using new or used plastic materials, a Z addition material being selected from fatty acids, mixtures containing natural or synthetic fatty acids (flax oil, thistle oil, corn oil), fatty acid derivatives comprising fatty alcohols; this mixture is mashed and pressed by mechanic means in a conveying device and, different stages between 60 and 400° C. Then, the subsequent conformation is performed when a V wetting additive is added which can be peroxide organic or inorganic compounds, namely hydrogen peroxide, monomers, oligomers and unsaturated polymers such as vinyl chloride. This patent is intended to provide better properties to plastic through a mixture of new and used materials from different sources. However, it does not seek the degradation in the matter and that it can, in some manner, be programmable, i.e., that a degradation time of said materials can be set.

On the other hand, the Mexican patent MX 2014015068 refers to a mixture for manufacturing a biodegradable plastic material comprising mucilaginous juice of vegetable origin, natural protein, vegetable wax and a moisturizer, wherein the mucilaginous juice is extracted from a plant of the species punthia ficu-indica and the natural protein is collagen (grenetin), the vegetable is candelilla wax and the moisturizer is glycerin. The disclosed process begins with adding natural protein to the mucilaginous juice at a ratio of 1:5, water is added and it is subjected to a temperature of 70° C., the moisturizer is added and it is subjected to a temperature of 90° C., then it is poured into molds and allows to cool, which then is properly shaped to be useful, for example, as a wrapping, for instance, layers, films, strips and bags; among others. This technology uses vegetable material for degrading plastic but it does not contain any of the organic materials with different additive form.

On the other hand, the Spanish patent ES 2065676 shows a plastic film, e.g. based on ethylene copolymer (polyolefins) to which a lignin is introduced which behaves as biodegradable organic additive, wherein the plastic film can be consumed by microorganisms without reducing the other properties of the product, namely the mechanic properties thereof. The lignin is added in the form of powder in a content of up to 75% based on the copolymer material. This patent applies the lignin in solid form and in powder, moreover the amounts of the additive are not in additive amount as such, but it would be mixture with a minimum ratio of polyethylene, which makes the physical properties of the materials to be low.

Patent CN 101302319 refers to easily degraded shopping bags which are made from polyvinyl alcohol plant fibers, gypsum (dehydrated calcium sulphate), salts, nontoxic water repellent agents and a method comprising the steps of adding water to the pulp, polyvinyl alcohol and the proportion of the mixture of alcohol polyvinyl; vegetable pulp, salts, water repellent agents and oil are 5:11:0.001:01:01 which then are mixed and filtered. The mixture is poured into molds to obtain the material, which then is extruded or by injection; the bag is produced which can be colored due to the addition of colorants. However, said invention reveals chemical agents searching for the final degradation.

The article entitled "Development of a plastic film from starch extracted from residual potato" teaches a process for extracting potato starch, wherein after, the starch obtained is mixed with water, glycerol ($C_3H_8O_3$) and hydrochloric acid 0.1 M, the mixture is stirred and then it is subjected to a heating step on a plate at 300° C. until a paste type material is obtained. After cooled, this mixture is subjected to a calandrate step wherein the mixture extends with a sharp glass rod until the film is obtained. Said technology uses a specific vegetable (potato) on a plate, which makes this technology a simple laboratory practice.

In this regard, the problem solved by the present invention is the provision of polymeric material with improved physical properties, such as strength, and which is easily and quickly biodegraded. Another solved problem is to find organic substance compositions which are suitable to participate in the manufacturing process of polymeric materials and which can aid in rapidly degrading the polymer.

DETAILED DESCRIPTION OF THE FIGURES

FIG. 1 shows the techno mechanic process for applying the degradable substance to the polymer in a binding process.

Figure 2:
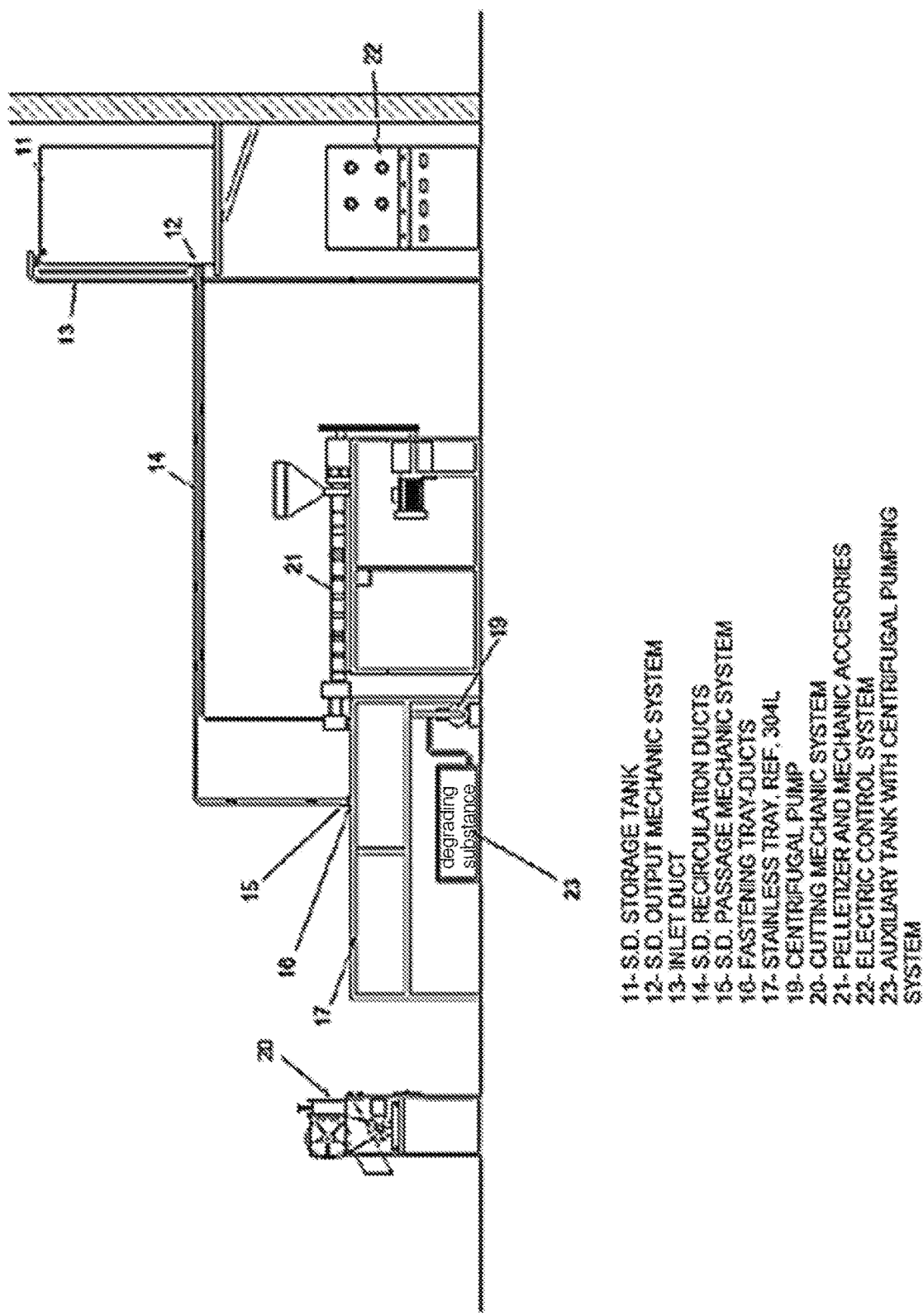

FIG. 2 corresponds to the addition mechanism of more percentage of the degradable substance in the pellet part.

Figure 3:
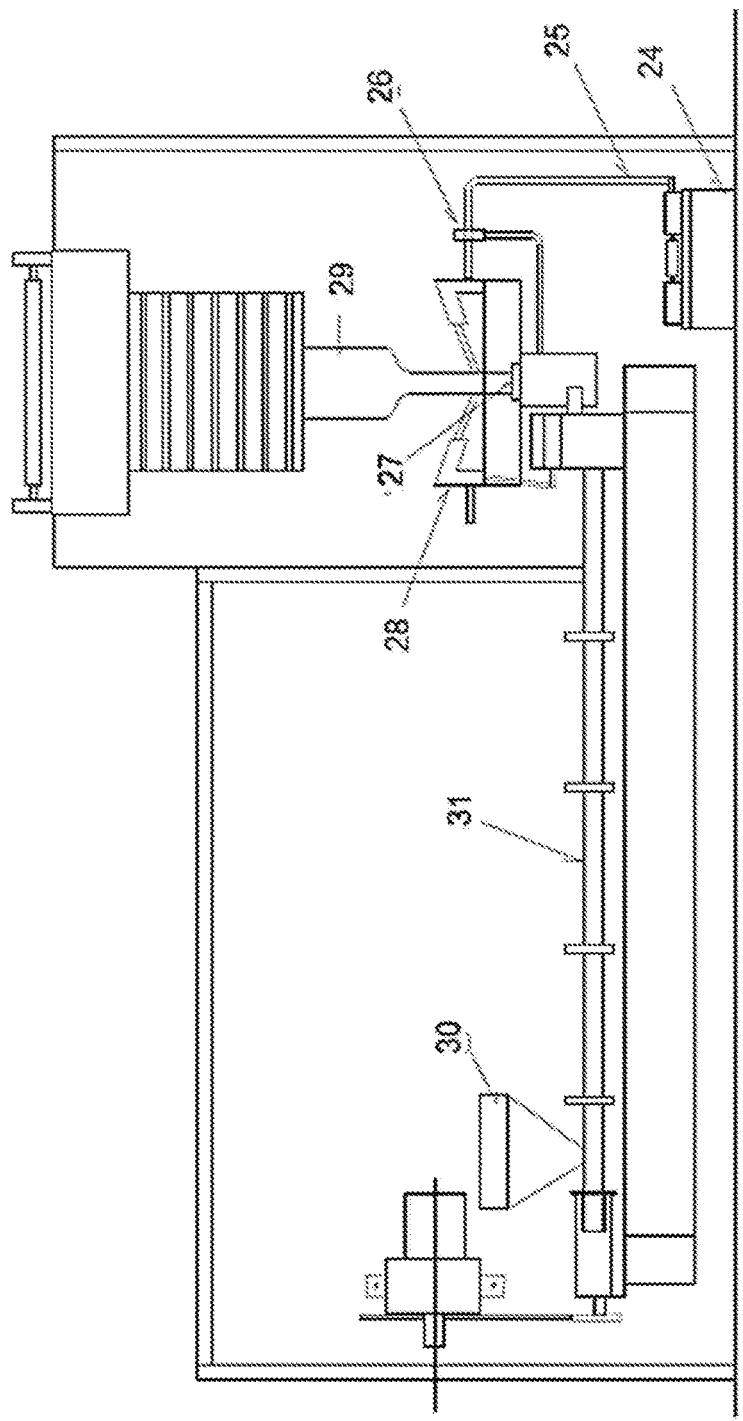

FIG. 3 shows the extrusion process which superficially applies a mixture of the above degrading substances on the film being extruded.

DETAILED DESCRIPTION OF THE INVENTION

An object of the present invention is a degrading organic additive for the recycled synthetic polymer and/or "original" which potentializes its decomposition in normal environmental conditions.

The degrading additive according to the invention, allows the accelerated degradation of recycled synthetic plastic and/or original, wherein, for the first case (recycled) a mixture of two degrading substances according to the invention can be added in the binding, pellet and extrusion or in the second case, when it refers to an original material (new) wherein only the degrading substance is added in the last stage of extrusion where it is integrated thereto from its manufacture.

In this regard, the invention also covers the process by which the manufacture of synthetic polymeric materials is performed, wherein the process comprises the steps of (a) binding, (b) pelletizing, (c) extruding, and (d) sealing and the addition of degrading substances which are involved in the first steps (a, b, c), for polymers such as polyamides, acrylics, polyesters, polyvinyls, elastanes, polyethylenes, polypropylenes, low density polystyrene, high density polystyrene, polypropylene, urethanes, etc.

According to the process of the present invention, the chemical transformation of polymer in its molecular structure is sought, to program the waste of cohesion and molecular modification of the polymer by the presence of the degrading substance(s) in the mechanic process according to the invention.

Even more, another object of the present invention is the polymeric material being obtained through the process of the invention, wherein said material contains the degrading substances also covered by the invention.

By degradation of a polymer can be understood the significate changes undergo in its chemical structure (loss of one or more carbon atoms in an open chain or a cycle) under the action of determined environmental conditions, thus resulting in a loss of properties of the material until obtaining its entire degradation.

According to the above, it is clear that the process and the degrading substances of the present invention allow to work with recycled and/or original (new) material from different sources. The polymer can be a low- or high-density polymer and its final use, could be, for example, a synthetic plastic bag for common packages through the use of recycled material.

The manufacturing process of the plastic bag to be degraded is based on a conventional process, but with improved technologies in the industrial process, which ensures the maintenance of the physical and mechanical properties required by the polymer during its manufacture and then in its commercial performance, such as, por example, the conservation of properties such as elongation, hardness and strength comparable to non-degradable conventional materials.

In this regard, the process of the present invention comprises the following steps
  a) Binding,
  b) Pelleting,
  c) Extruding, and
  d) Sealing.

The process of the invention involves the participation of the degrading substances of the invention in the first three steps (a, b, c).

The conditions for step a) of binding, is a temperature between 110° C. to 150° C., with normal atmospheric pressure. In this step of the process, a degrading substance according to the invention called A is added from a storage tank (1), through a pipeline to a mechanic irrigation system (7) located on the upper part of the distribution system or mechanism (8) of the binder (9) as shown in FIG. 1. The degrading substance according to the invention contains:

betaine ($C_5H_{11}NO_2$): between 15 and 23% (w/w) in relation to the weight of the total degrading substance;
cassava (yuca) starch ($C_6H_{10}O_5$): between 10 and 17% in relation to the weight of the total degrading substance;
carrot carotene ($C_{40}H_{56}$): between 10 and 15% in relation to the weight of the total degrading substance;
water: between 35 and 48% in relation to the weight of the total degrading substance;
carbon monoxide: between 0.001% and 10%, preferable between 0.1% and 5% in relation to the weight of the total degrading substance;

In step a), the temperature adhering the synthetic polymeric material by its oscillating movement against the walls of the metal container in its mechanic process and the cut of said material through the inner blades of the container makes the degrading substance A to be adhered to its molecular structure. In the process of the invention, the binding container is incorporated through an irrigation system wherein the degrading substance A which is coming from an auxiliary tank is evenly applied under pressure in order to incorporate agents acting in degrading the future polymeric material.

The conditions in step b) are related to the temperature in different displacement zones of the polymer by the extruding device as shown in FIG. 2, i.e. with the temperature controlled and constant of the endless screw containing it as shown in system 21 of the pelletizer shown in FIG. 2. This temperature must be in a range from 180 to 250° C., allowing thereby the polymer to be displaced from the hopper to the given extruder and depositing the pelletized material in the tray (17) of FIG. 2 which contains substance B to eb adhered to the polymer. In this step of the process, substance B is in constant recirculation between an upper tank (11) and the tray (17) receiving the polymeric material through an auxiliary tank with a centrifugal mechanic pumping system which makes the recirculation of substance B.

The component corresponds to another degrading substance according to the invention, being called substance "B" and which is involved in this part of the process, the substance being characterized by containing:

cassava (yuca) starch ($C_6H_{10}O_5$) between 8 and 15% weight;
betaine ($C_5H_{11}NO_2$) between 18 and 22% in relation to the weight of the total degrading substance;
corn glucose ($C_6H_{12}O_6$) between 4 and 9% in relation to the weight of the total degrading substance; and
water: between 40 and 58% in relation to the weight of the total degrading substance.

In step c) of the process of the invention, which corresponds to extruding, the temperature conditions in different displacement zones of the polymer by the device as shown in FIG. 3, i.e. with the temperature controlled and constant of the endless screw and the barrel (8) containing it. This temperature must be in a range from the hopper (7) according to FIG. 3, to the given extruder. In this step of the process, the mixture of the degrading substances A and B is applied by a specific mechanic homogeneous spraying system (5) where the substance A+B is subjected to a pressure between 120 and 220 psi (0.83 MPa and 1.52 MPa), preferably from 150 to 180 psi (1.03 MPa to 1.24 MPa) and ejects the substance on the surface of the polymeric film extruded at the molding. The volume mixture rate between substance A and substance B is between 28% A and 70% B up to 70% A and 28% B and completing its volume with a carboxylic acid of 1 to 6 carbon atoms, such as, for example, formic, acetic, propanoic acid and mixtures thereof.

The betaine according to the invention, can be obtained in a synthetic manner or as a result of an extraction from a natural vegetable product such as, for example, beet.

The total percentage of the degrading substances according to the invention, which are added in each of the manufacturing steps, is the sum thereof and is in a range from 1.2% to 11% and it is determined according to the needs of the customer.

In an embodiment of the invention, step c) can be an injection, expanding or blowing step depending on the forming machine and the desired final product.

The process of the invention, may comprise at the end of the set of above shown steps, one sealing step to finally have a degradable polymeric product, for example, a degradable plastic bag in the dimensions above specified described by the user or client.

The invention is also directed to a synthetic, biodegradable polymeric material characterized by comprising a polymer between 89% and 98.8% and an additive comprising the substance A containing:
betaine ($C_5H_{11}NO_2$): between 15 and 23% (w/w) in relation to the weight of the total degrading substance;
cassava (yuca) starch ($C_6H_{10}O_5$): between 10 and 17% in relation to the weight of the total degrading substance;
carrot carotene ($C_{40}H_{56}$): 10 and 15% in relation to the weight of the degrading substance;
water: between 35 and 48% in relation to the weight of the total degrading substance;
carbon monoxide: between 0.001% and 10%, preferably between 0.1% and 5% in relation to the weight of the total degrading substance, and a substance B containing:
cassava (yuca) starch ($C_6H_{10}O_5$) between 8 and 15% weight;
betaine ($C_5H_{11}NO_2$) between 18 and 22%;
corn glucose ($C_6H_{12}O_6$): between 4 and 9% and
water: between 40 and 58% and carboxylic acid selected from formic acid, propanoic acid and acetic acid and mixtures thereof.

The invention claimed is:

1. A process for manufacturing a biodegradable synthetic polymeric material, comprising the steps of:
   a. binding a first degrading substance from a storage tank through a pipe to a mechanic irrigation system, wherein the first degrading substance comprises betaine ($C_5H_{11}NO_2$), cassava (yucca) starch ($C_6H_{10}O_5$), carrot carotene ($C_{40}H_{56}$), water, carbon monoxide, corn glucose ($C_6H_{12}O_6$), and a 1 to 6 carbon atoms carboxylic acid;
   b. pelletizing the substance obtained in step a) along with a second degrading substance comprising betaine ($C_5H_{11}NO_2$), cassava (yucca) starch ($C_6H_{10}O_5$), water, and corn glucose ($C_6H_{12}O_6$), and
   c. extruding the mixture of the substance obtained in steps a) and b) through a mechanic sprinkler system, and
   d. sealing the final material obtained;
   wherein the biodegradable synthetic polymer material comprises
   betaine ($C_5H_{11}NO_2$) is between 15 and 25% (w/w) in relation to the weight of the total degrading substance;
   the cassava (yucca) starch ($C_6H_{10}O_5$) is between 10 and 17% in relation to the weight of the total degrading substance;
   the carrot carotene ($C_{40}H_{56}$) is between 10 and 15% in relation to the weight of the total degrading substance;
   the water is between 35 and 48% in relation to the weight of the total degrading substance;
   the carbon monoxide is between 0.001% and 10% in relation to the weight of the total degrading substance;
   the corn glucose ($C_6H_{12}O_6$) is between 4 and 9%; and
   the carboxylic acid is selected from the group consisting of formic acid, propanoic acid, acetic acid and mixtures thereof; and
   wherein in step a) the binding container has a mechanic irrigation system where the degrading substance from step a) coming from a storage tank is evenly applied under pressure and in step b) the substance obtained from step b) is in constant recirculation between an upper tank and the receiving tray of the polymeric material through an auxiliary tank with a pumping centrifugal mechanic system and in step c), the mixture of first and second degrading substances from steps a)+b) is applied by a specific homogeneous spraying mechanic system wherein the first and second substances from steps a)+b) is subjected to a pressure between 120 and 220 psi (0.83 MPa to 1.52 MPa), and ejects the substance over the surface of the extruded polymeric film by molding.

2. The process according to claim 1, wherein in step a) of binding, the degrading substance is present in the following proportions:
   betaine ($C_5H_{11}NO_2$) between 15 and 23% (w/w) in relation to the weight of the total degrading substance;
   cassava (yucca) starch ($C_6H_{10}O_5$) between 10 and 17% in relation to the weight of the total degrading substance;
   carrot carotene ($C_{40}H_{56}$) between 10 and 15% in relation to the weight of the total degrading substance;
   water between 35 and 48% in relation to the weight of the total degrading substance;
   carbon monoxide between 0.001% and 10%, in relation to the weight of the total degrading substance.

3. The process according to claim 1, wherein in step b) of pelletizing, the degrading substance is present in the following proportions:
   cassava (yucca) starch ($C_6H_{10}O_5$) between 8 and 15% in relation to the weight of the total degrading substance;
   betaine ($C_5H_{11}NO_2$) between 18 and 22% in relation to the weight of the total degrading substance;
   corn glucose $C_6H_{12}O_6$ between 4 and 9% in relation to the weight of the total degrading substance; and
   water between 40 and 58% in relation to the weight of the total degrading substance.

4. The process according to claim 1, wherein in step c) of extruding, a degrading substance of steps a)+b) is added, which has a volume mixture ratio between the substance of a) and the substance of b) between 28% a) and 70% b) up to 70% a) and 28% b) and completing the volume with a 1 to 6 carbon atoms carboxylic acid or mixtures thereof.

5. A first polymer degrading substance comprising:
   betaine ($C_5H_{11}NO_2$) between 15 and 23% (w/w) in relation to the weight of the total degrading substance;
   cassava (yucca) starch ($C_6H_{10}O_5$) between 10 and 17% in relation to the weight of the total degrading substance;
   carrot carotene ($C_{40}H_{56}$) 10 and 15% in relation to the weight of the total degrading substance;
   water between 35 and 48% in relation to the weight of the total degrading substance; and
   carbon monoxide between 0.001% and 10% in relation to the weight of the total degrading substance.

6. A second polymer degrading substance comprising:
   cassava (yucca) starch ($C_6H_{10}O_5$) between 8 and 15% wt.;
   betaine ($C_5H_{11}NO_2$) between 18 and 22%;
   corn glucose ($C_6H_{12}O_6$) between 4 and 9%; and
   water between 40 and 58%.

7. The polymer degrading substance comprising a first polymer according to claim 5 and a second polymer according to claim 6, wherein:
- the volume mixture ratio between the polymer degrading substance according to claim 5 and the polymer degrading substance according to claim 6 is between 28% and 70% of the polymer degrading substance according to claim 5 and between 70% and 28% of the polymer degrading substance according to claim 6: and,
- a carboxylic acid selected from the group consisting of formic acid, acetic acid, propanoic acid and mixtures thereof.

8. A biodegradable, synthetic polymeric material obtained by the process according to claim 1, wherein the polymer comprises between 89% and 98.8% of the biodegradable, synthetic polymeric material and wherein:

a) the first substance contains:
- betaine ($C_5H_{11}NO_2$) between 15 and 23% (w/w) in relation to the weight of the total degrading substance;
- cassava (yucca) starch ($C_6H_{10}O_5$) between 10 and 17% in relation to the weight of the total degrading substance;
- carrot carotene ($C_{40}H_{56}$) between 10 and 15% in relation to the weight of the total degrading substance;
- water between 35 and 48% in relation to the weight of the total degrading substance; and
- carbon monoxide between 0.001% and 10%, in relation to the weight of the total degrading substance; and b) the second substance contains:
- cassava (yucca) starch ($C_6H_{10}O_5$) between 8 and 15% weight;
- betaine ($C_5H_{11}NO_2$) between 18 and 22% in relation to the weight of the total degrading substance;
- corn glucose $C_6H_{12}O_6$: between 4 and 9% in relation to the weight of the total degrading substance;
- water: between 40 and 58%; and
- carboxylic acid selected from formic acid, propanoic acid and acetic acid and mixtures thereof.

* * * * *